Nov. 17, 1970   L. L. VAN DIERENDONCK   3,541,062
PROCESS FOR WORKING UP A SUSPENSION
Filed March 17, 1967   2 Sheets-Sheet 1

United States Patent Office 3,541,062
Patented Nov. 17, 1970

3,541,062
PROCESS FOR WORKING UP A SUSPENSION
Laurentius L. van Dierendonck, Geleen, Netherlands, assignor to Stamicarbon N.V., Heerlen, Netherlands
Filed Mar. 17, 1967, Ser. No. 624,025
Claims priority, application Netherlands, Mar. 22, 1966, 6603761
Int. Cl. C08c 1/00
U.S. Cl. 260—80.78                                   5 Claims

ABSTRACT OF THE DISCLOSURE

Increasing the through-put capacity of apparatus for working up rubbery polymer crumbs by stirring the crumbs with a knife-blade stirrer in a hot aqueous suspension to which 0.5% by volume CMC is added as a viscosity increasing agent.

BACKGROUND OF THE INVENTION

Synthetic rubbers are usually prepared by polymerizing monomers in a solvent, e.g., an aromatic or aliphatic hydrocarbon, which produces a rubber solution. This solution is stirred in hot water, as a result of which the rubber is suspended in the water in the shape of crumbs and the solvent is evaporated from the crumbs. In order to avoid preventing the evaporation of the solvent, the crumbs must not agglomerate in the suspension; the evaporation is promoted, on the other hand, by distributing the crumbs more finely.

According to a known process the same dimensions of the crumbs are retained, or smaller dimensions of the crumbs are effected by working up the suspension by means of one or more stirrers provided with at least one knife-shaped part, it being sufficient to keep the crumb particles suspended in water.

SUMMARY OF THE INVENTION

The present invention relates to a process for working up suspended crumbs, beads, flakes, or the like, of polymers, in particular of a synthetic rubber, by means of one or more stirrers provided with at least one knife-shaped part.

It has now been found that the disintegrating action of such a stirrer can be considerably improved by adding to the suspension liquid an agent that raises the viscosity thereof.

The process according to the invention can be used for disintegrating coarse polymer particles suspended in a liquid, but is particularly suitable for disintegrating sticky polymers, such as synthetic rubbers. What is achieved is that the solvent can be removed to the desired extent from the crumbs suspended in water in a considerably shorter period of time than would be possible by the known process, because the crumbs are divided into particles of smaller dimensions. The capacity of an installation is consequently considerably enlarged.

Examples of rubbers in the preparation of which the process according to the invention can be used are polymers of diolefines, i.e., polybutadiene and polyisoprene, and copolymers of ethylene and at least one other alkene and/or at least one poly-unsaturated compound. These include both saturated copolymers containing, in addition to ethylene, one or more other alkenes, e.g., propene, butene-1, pentene-1, hexene-1, 4-methyl pentene-1, isobutene, styrene, or α-methyl styrene, and unsaturated copolymers consisting of ethylene, another alkene, e.g., propene, and a poly-unsaturated compound, e.g., butadiene, isoprene, pentadiene-1,4, hexadiene-1,4, monovinyl cyclohexene, cyclopentadiene, dicyclopentadiene, cyclo-octadiene, 5-alkenyl-2 norborneenes, 5-alkylidene, 2-norborneenes, 2-alkyl 2.5-norbornadienes, 4,7,8,9-tetrahydroindene, and bicyclo[4,2,0]octadiene-3,7.

The viscosity-raising agent used by preference for an aqueous suspension is carboxymethyl cellulose (CMC), or similar products. In the preparation of rubber residual traces of this agent are in general not harmful to the quality of the end product. It is furthermore easy to remove this agent from the waste product in a biological way.

It is commonly known, e.g., from the British patent specification 990,325, to add cellulose products to a suspension of rubber crumbs to prevent the crumbs from caking together. However, no suggestion of viscosity agent addition to enhance particle size reduction is present in that specification. The present invention aims at improving the disintegrating action of a knife stirrer by addition of a viscosity-raising agent.

The process according to the invention may also be used to remove traces of the solvent from the crumbs, after part of the solvent has already been removed in another way. The process may also be used exclusively with the object of effecting a finer distribution of crumbs, beads, flakes, or the like, of polymers suspended in a liquid and not containing a solvent.

BRIEF DESCRIPTION OF THE DRAWING

The invention will be further elucidated with reference to a drawing which shows an embodiment of a device for carrying out the process.

Figures 1, 2:
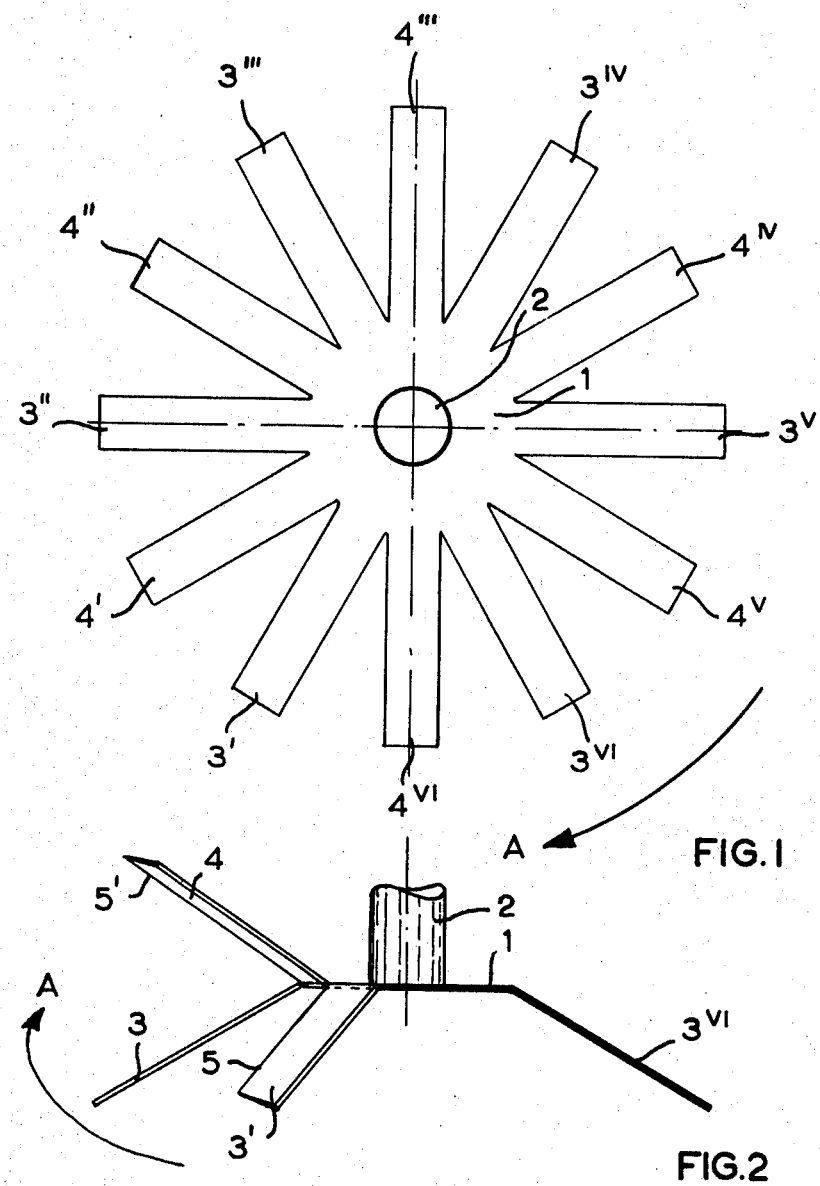
FIG. 1 is a top plan view of a blade stirrer
FIG. 2 is a side elevation view of this stirrer.

The blade stirrer is composed of a plate-shaped central part 1, to which a drive shaft 2 is connected. Extensions 3, 4, 3', 4', etc., of the central part form propeller blades of the stirrer. To obtain a proper stirring action, these blades are slightly twisted. As viewed in the direction of rotation A, the leading sides of the propeller blades are knife-shaped, as is shown in FIG. 2, where some visible knife-shaped sides are indicated by references 5 and 5'. In other words the blades taper in thickness toward respective leading edges to provide knife-like shapes.

An object in dimensioning a stirrer is to keep the power number $N_p$ as small as possible. The power number formula is:

$$N_p = \frac{P}{\rho n^3 d^5}$$

where

P is the power to be imparted to the shaft;
$\rho$ is the density of the liquid;
$n$ is the number of revolutions of the shaft; and
$d$ is the diameter of the stirrer.

From the formula it follows that the power to be imparted P can be small if $N_p$ is small. For a propeller stirrer provided with knives $N_p$ equals approximately 0.3, at a Reynolds number of $>10^3$, which is comparable with the value of a normal propeller stirrer, whereas, for instance, $N_p=6$ in the case of a turbine mixer.

Figure 3:
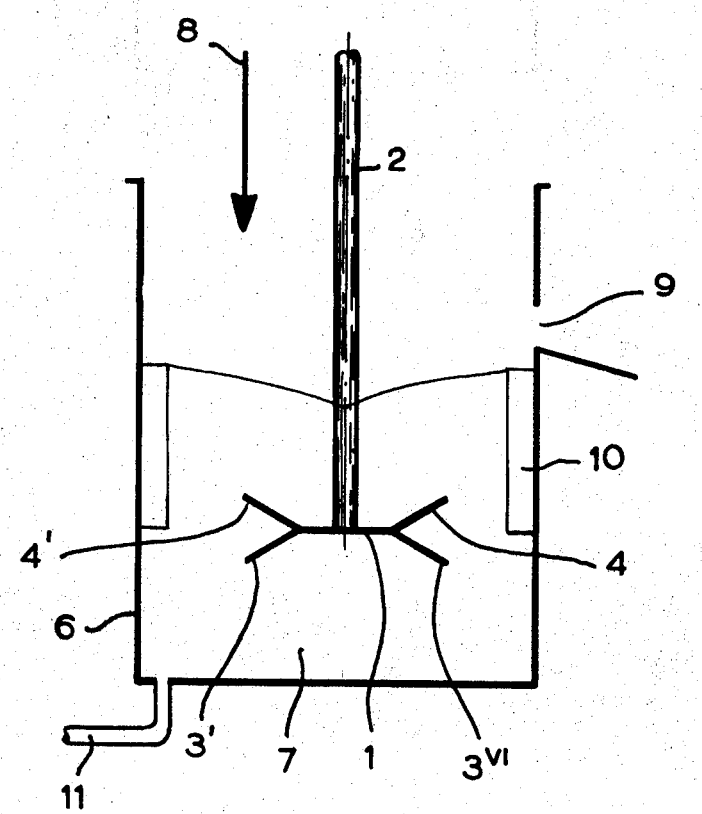
FIG. 3 is a side elevation view showing the arrangement of the stirrer in a vessel, the vessel being diametrically longitudinally sectioned to expose the interior thereof.

To improve the desired action of the knife-blade stirrer, the blades of the propeller are bent from the plane of the central part of the propeller, alternately in different directions, so that, in the arrangement of FIG. 3, the blades 3 point downwards and the blades 4 upwards, e.g., at an angle of 30° with respect to the plane of the central part. FIG. 3 furthermore shows a vessel 6 which contains an aqueous suspension 7 and into which a solution from which crumbs can form is fed at 8, the stirred suspension being discharged at 9. Mounted in the center of the vessel is one propeller stirrer, the central part 1, the drive shaft 2, and some propeller blades 3 and 4 of which are shown schematically. The vessel is furthermore provided with baffles 10 fitted to the wall and extending to about the height of the stirrer center. Hot steam for heating the suspension is fed into the vessel at 11, to enable the solvent to be evaporated from the crumbs.

EXAMPLES

Suspensions of ethylene - propylene - dicyclopentadiene terpolymer crumbs were stirred for a given time at a given temperature (A) in water and (B) in water with addition of 0.5% by volume of CMC by means of a propeller stirrer with knife-shaped blades as shown in the drawing to remove hexane contained in the crumbs. The viscosity of the suspension liquid was with the used CMC, 50 centipoise.

The hexane content of the crumbs was determined at certain intervals.

The results were:

| Time in minutes | A, water temp. 72° C., hexane percent by weight | B, water+0.5% CMC, temp. 72° C., hexane percent by weight |
|---|---|---|
| 0 | 7.0 | 6.2 |
| 60 | 1.2 | 0.4 |
| 120 | 0.4 | 0.2 |

| Time in minutes | A, water temp. 95° C., hexane [1] percent by weight | B, water+0.5% CMC, temp. 95° C., hexane [2] percent by weight |
|---|---|---|
| 0 | 8.5 | 8.2 |
| 10 | 1.4 | 0.8 |
| 30 | 0.9 | 0.4 |
| 60 | 0.5 | 0.14 |
| 90 | 0.3 | 0.09 |
| 120 | 0.2 | 0.05 |

[1] Crumb size: 4-7 mm.
[2] Crumb size: 1-4 mm.

To satisfy a demand that the hexane content of the treated crumbs shall be 0.5%, the dwell time can be shortened at 72° C., from about 120 minutes without addition of CMC to less than 60 minutes with addition of 0.5% CMC. At a temperature of 95° C. the dwell time is shortened from 60 minutes to less than 30 minutes. Consequently, the dwell time can approximately be halves, in general when the principles of this invention are employed. The examples furthermore show that the capacity of a given device can approximately be doubled by the addition of 0.5% CMC to the water. Although in the preferred embodiment of the process 0.5% CMC is added to the suspension agent, the amount of this CMC can be decreased to about 0.1% or increased to about 1.5%, yet provide benefits of the character evident from the examples. In place of part or all of the CMC, the following viscosity increasing agents, among others, can be employed: ethyl hydroxyethyl cellulose, polyacrylic acid sodium, pectin, glycerol, cornflour or similar products. Adding these products, the viscosity of the suspension liquid should be raised to 100 centipoise, by preference to about 50 centipoise.

It should now be apparent that the process for working up a suspension as described hereinabove possesses each of the attributes set forth in the specification under the heading "Summary of the Invention" heretobefore. Because the process for working up a suspension of the invention can be modified to some extent without departing from the principles of the invention as they have been outlined and explained in this specification, the present invention should be understood as encompassing all such modifications as are within the spirit and scope of the following claims.

What is claimed is:
1. The process for working up suspended crumbs, beads, flakes and like particles of a rubbery polymer in a liquid suspension agent contained in a vessel comprising:
   adding a viscosity-increasing agent to the liquid suspension agent; and
   stirring the rubbery polymer liquid suspension agent/viscosity-increasing agent suspension with at least one knife-shaped part, moving the knife edge forwardly.
2. The process of claim 1 wherein the step of adding a viscosity-increasing agent to the liquid suspension agent comprises adding carboxymethyl cellulose or similar products to water.
3. The process of claim 1 wherein the step of adding a viscosity-increasing agent to the liquid suspension agent comprises adding carboxymethylcellulose or similar products to an aqueous suspension of particles of synthetic rubber polymer, so that the viscosity of the suspension liquid is about 50 centipoise.
4. The process which comprises the steps of:
   (a) continuously feeding a stream of solution from which rubbery crumbs of copolymers of ethene and at least one other alkene and/or at least one polyunsaturated compound can form, into an aqueous suspension of these copolymer crumbs;
   (b) adding and maintaining carboxymethyl cellulose or similar products to the suspension, so that the viscosity of the suspension liquid is about 50 centipoise;
   (c) continuously stirring said suspension with a knife-blade stirrer;
   (d) holding quanta of said suspension within the ambit of the stirring step until the average size of the crumbs of copolymer therein has been reduced to a predetermined lower value than that of the original average size thereof, then
   (e) removing said quanta from the influence of the stirring.
5. The process of claim 4 wherein said solution includes a solvent more volatile than water and at least part of which remains in the copolymer crumbs as said crumbs form and the process further includes the steps of:
   (f) adding heat to the suspension for evaporating solvent from said copolymer crumbs; and
   (g) holding said quanta of said suspension within the ambit of the stirring step until the concentration of solvent in the copolymer crumbs thereof has been reduced to a predetermined lower level.

References Cited
UNITED STATES PATENTS

| | | | |
|---|---|---|---|
| 2,497,926 | 2/1950 | Bruson | 260—89.1 |
| 2,955,907 | 10/1960 | Kolb | 18—54 |
| 3,148,176 | 9/1964 | Juveland et al. | 280—88.2 |
| 3,303,180 | 2/1967 | Beckmann et al. | 260—94.7 |
| 3,413,247 | 11/1968 | Schroeder | 260—17 |

JOSEPH L. SCHOFER, Primary Examiner

J. C. HAIGHT, Assistant Examiner

U.S. Cl. X.R.

260—88.2, 94.7, 96